United States Patent
Kidamura

(10) Patent No.: US 9,645,737 B2
(45) Date of Patent: May 9, 2017

(54) INFORMATION PROCESSING APPARATUS, CONTROL DEVICE, AND CONTROL METHOD

(71) Applicant: FUJITSU LIMITED, Kawasaki-shi, Kanagawa (JP)

(72) Inventor: Takashi Kidamura, Kahoku (JP)

(73) Assignee: FUJITSU LIMITED, Kawasaki (JP)

(*) Notice: Subject to any disclaimer, the term of this patent is extended or adjusted under 35 U.S.C. 154(b) by 205 days.

(21) Appl. No.: 14/534,232

(22) Filed: Nov. 6, 2014

(65) Prior Publication Data

US 2015/0143137 A1 May 21, 2015

(30) Foreign Application Priority Data

Nov. 19, 2013 (JP) ................ 2013-238925

(51) Int. Cl.
G06F 1/00 (2006.01)
G06F 1/26 (2006.01)
G06F 1/32 (2006.01)
G06F 11/30 (2006.01)
G06F 3/06 (2006.01)

(52) U.S. Cl.
CPC .......... *G06F 3/06* (2013.01); *G06F 1/32* (2013.01); *G06F 1/3203* (2013.01); *G06F 1/325* (2013.01); *G06F 1/3206* (2013.01); *G06F 1/3215* (2013.01); *G06F 1/3221* (2013.01); *G06F 1/3225* (2013.01); *G06F 1/3246* (2013.01); *G06F 1/3256* (2013.01); *G06F 1/3268* (2013.01); *G06F 1/3287* (2013.01); *Y02B 60/1246* (2013.01)

(58) Field of Classification Search
None
See application file for complete search history.

(56) References Cited

U.S. PATENT DOCUMENTS

| | | | |
|---|---|---|---|
| 9,207,741 B2 * | 12/2015 | Tsukamoto | G06F 3/0625 |
| 2006/0075190 A1 | 4/2006 | Higaki et al. | |
| 2007/0101174 A1 | 5/2007 | Tsukimori et al. | |
| 2008/0162960 A1 | 7/2008 | Higaki et al. | |
| 2012/0072664 A1 | 3/2012 | Higaki et al. | |
| 2014/0006873 A1 * | 1/2014 | Kidamura | G06F 11/0751 714/42 |
| 2014/0173318 A1 * | 6/2014 | Kidamura | G06F 1/26 713/340 |
| 2015/0019919 A1 * | 1/2015 | Kidamura | G06F 11/1604 714/56 |
| 2015/0143137 A1 * | 5/2015 | Kidamura | G06F 1/3268 713/300 |
| 2015/0143175 A1 * | 5/2015 | Kidamura | G06F 11/0706 714/23 |

FOREIGN PATENT DOCUMENTS

| | | |
|---|---|---|
| JP | 2006-106980 | 4/2006 |
| JP | 2007-122437 | 5/2007 |

* cited by examiner

Primary Examiner — Tanh Nguyen
(74) Attorney, Agent, or Firm — Fujitsu Patent Center

(57) ABSTRACT

An information processing apparatus includes a monitoring unit that monitors a reception of a power-on instruction from a second control device among the plurality of control devices, and a prevention unit that prevents an issue of the power-on instruction to the second control device when the monitoring unit detects the power-on instruction from the second control device. Therefore, the control device can prevent the occurrence of unintended power-on operations.

9 Claims, 10 Drawing Sheets

INFORMATION PROCESSING APPARATUS, CONTROL DEVICE, AND CONTROL METHOD

CROSS-REFERENCE TO RELATED APPLICATION

This application is based upon and claims the benefit of priority of the prior Japanese Patent application No. 2013-238925, filed on Nov. 19, 2013, the entire contents of which are incorporated herein by reference.

FIELD

The embodiments discussed herein are directed to an information processing apparatus, a control device, and a control method.

BACKGROUND

FIG. 6 is a diagram illustrating an example of a connection with a server in a general Redundant Arrays of Inexpensive Disks (RAID) device.

The RAID device 1000 illustrated in FIG. 6 includes two redundant controller modules (CMs) 1010a and 1010b. In addition, a server 2000 is connected to the CM 1010a in the two CMs 1010a and 1010b.

In order to operate the RAID device by using the redundancy of the CMs 1010a and 1010b, for example, it is preferable that both of the two CMs 1010a and 1010b transition to a power-on state when receiving a power-on instruction from a switch (not illustrated) or the server 2000.

However, the CM 1010b, which is not connected to the server 2000, cannot receive the power-on instruction from the server 2000. Therefore, there is a need for a control (power matching) that matches power states between the two CMs 1010a and 1010b.

Patent Document 1: Japanese Laid-open Patent Publication No. 2006-106980
Patent Document 2: Japanese Laid-open Patent Publication No. 2007-122437

However, a storage device with a conventional method of matching power between CMs is started, stopped, and restarted by an operation of an operator. Thus, a power on/off signal is abnormally transferred between the CMs by an unexpected operation, and a power-on operation unintended by an operator occurs.

SUMMARY

Therefore, the information processing apparatus is an information processing apparatus including a plurality of redundant control devices, wherein a first control device among the plurality of control devices includes: a monitoring unit that monitors a reception of a power-on instruction from a second control device among the plurality of control devices; and a prevention unit that prevents an issue of the power-on instruction to the second control device when the monitoring unit detects the power-on instruction from the second control device.

Also, the control device is a control device provided in redundancy with other control device and includes: a monitoring unit that monitors a reception of a power-on instruction from the other control device; and a prevention unit that prevents an issue of the power-on instruction to the other control device when the monitoring unit detects the power-on instruction from the other control device.

Furthermore, the control method is a control method for a storage device including a plurality of control devices, wherein a first control device among the plurality of control devices performs: a process of monitoring a reception of a power-on instruction from a second control device among the plurality of control devices; and a process of preventing an issue of the power-on instruction to the second control device when the power-on instruction from the second control device is detected.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
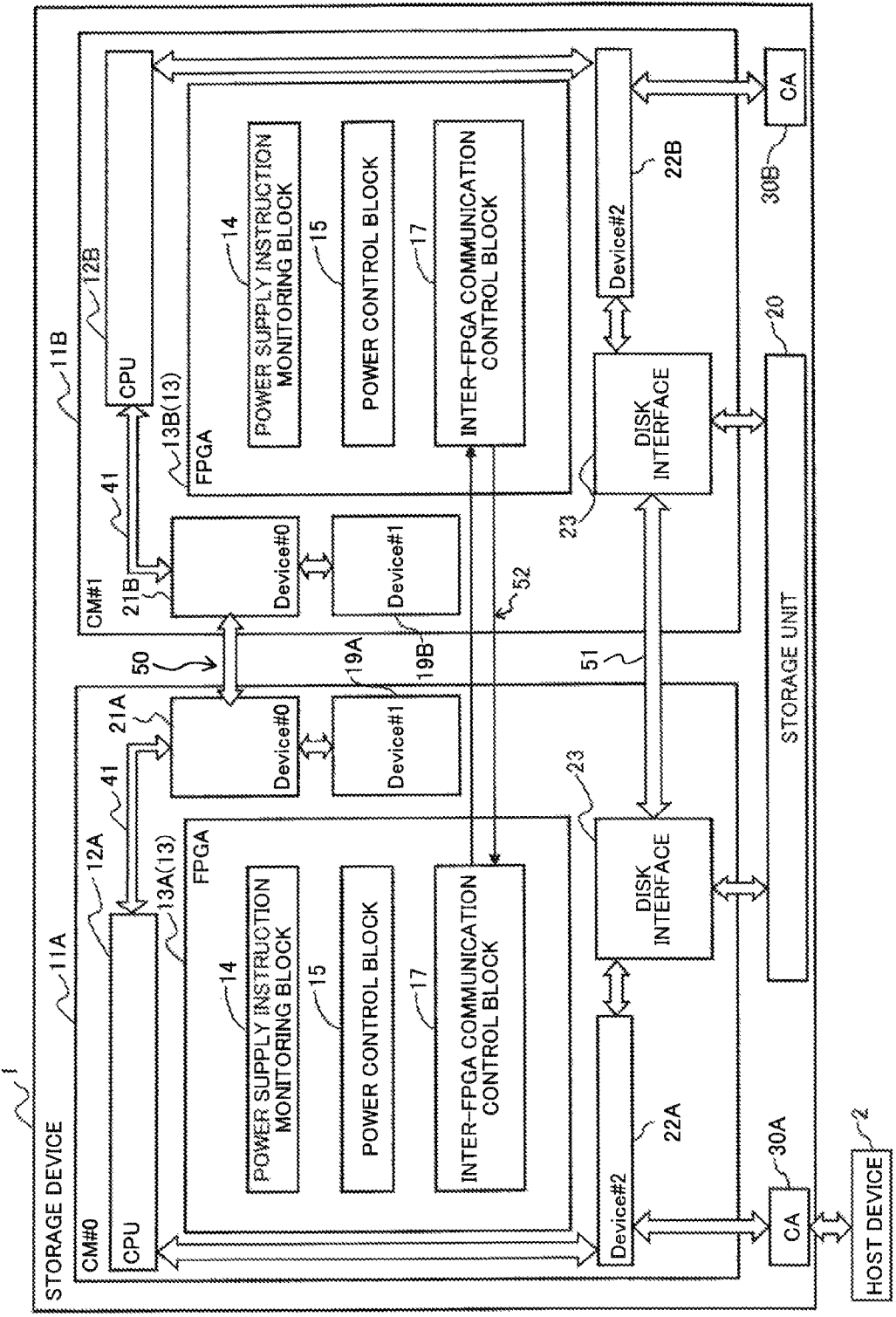
FIG. 1 is a block diagram illustrating a hardware configuration and a functional configuration of a storage device as an example of an embodiment.

Hereinafter, an information processing apparatus, a control device, and a control method according to embodiments will be described with reference to the drawings. However, the following embodiments are merely exemplary. Unless otherwise specified in the following embodiments, the following embodiments are not intended to exclude various modifications or technical applications. That is, the present embodiments can be carried out in various forms without departing from the scope of the present embodiments. In addition, each drawing can include other functions or the like, instead of the effect that includes only components illustrated in the drawing.

Figure 2:
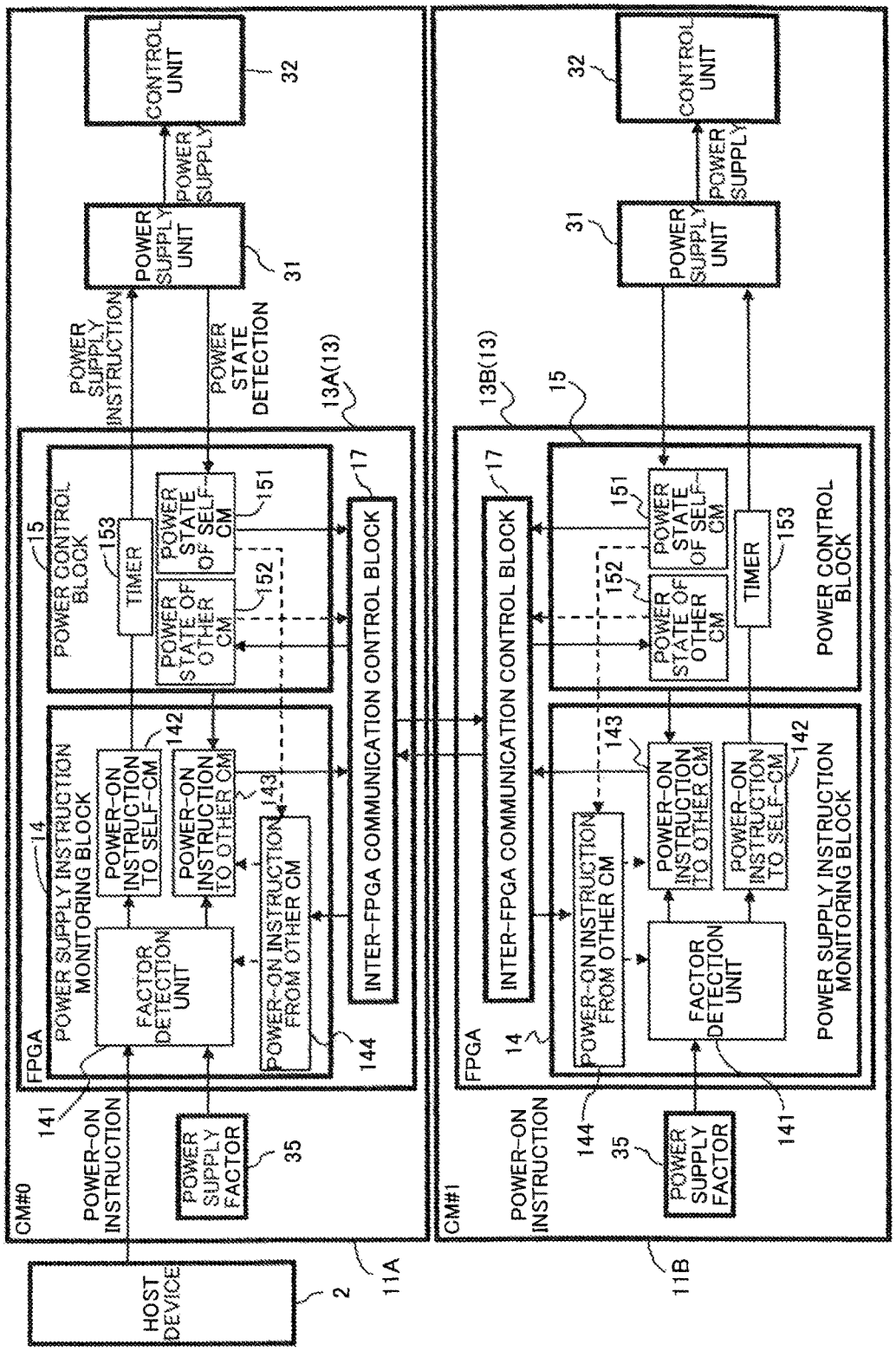
FIG. 2 is a diagram illustrating a functional configuration for realizing a power matching function of a storage device as an example of an embodiment.

FIG. 1 is a block diagram illustrating a hardware configuration and a functional configuration of a storage device 1 as an example of an embodiment, and FIG. 2 is a diagram illustrating a functional configuration for realizing a power matching function thereof.

The storage device 1 illustrated in FIG. 1 forms a virtual storage environment by virtualizing one or more storage devices (physical devices) (not illustrated) accommodated in a storage unit 20. The storage device 1 provides a virtual volume to a host device (not illustrated) being a high-level device.

The storage device 1 is communicably connected to one or more host devices 2. In the example illustrated in FIG. 1, the host device 2 is connected to the CA 30A in a pair of CAs 30A and 30B provided in the storage device 1. Therefore, the host device 2 is connected to only a controller module (CM) 11A in two CMs 11A and 11B provided in the storage device 1.

The host device 2 is, for example, an information processing apparatus having a server function and transmits and receives a command of a Network Attached Storage (NAS) or a Storage Area Network (SAN) with the storage device 1. For example, the host device writes data to or read data from the volume, which is provided by the storage device 1, by transmitting a disk access command, such as read/write, to the storage device 1.

Also, the host device 2 performs a power on/off control on the storage device 1. That is, the host device 2 issues a power-on instruction or a power-off instruction to the storage device 1.

The storage device 1 performs a process such as data read or write on the actual storage corresponding to the volume in response to an input/output request (for example, a read command or a write command) performed on the volume by the host device 2.

The storage device 1 includes one or more CMs 11A and 11B (two CMs in the example illustrated in FIG. 1) and the storage unit 20.

The storage unit 20 includes one or more storage devices (not illustrated) and provides storage areas of the storage devices to the host device connected through the CAs 30A and 30B. Incidentally, the RAID may be constituted using a plurality of storage devices.

The CMs 11A and 11B are control devices (storage control devices) that perform various controls. The CMs 11A and 11B perform various controls, such as a control of access to the storage unit 20, according to a host I/O from the host device. Incidentally, hereinafter, as symbols indicating the CMs, symbols 11A and 11B are used when it is necessary to specify one of a plurality of CMs, and symbol 11 is used when an arbitrary CM is indicated.

The CMs 11A and 11B have substantially the same configuration and are redundant. That is, the CMs 11A and 11B are duplicated.

Incidentally, in the drawing, since the same reference numerals and symbols as those described above indicate the same parts, a description thereof will be omitted.

Also, when the CM 11A connected to the host device 2 receives a power-on instruction, a power-off instruction, or a restart instruction from the host device 2, the storage device 1 performs a (power matching) control of matching power states between the CM 11A and the CM 11B. Also, hereinafter, the CM 11A connected to the host device 2 is also referred to as a host connected CM 11A, and the CM 11B not connected to the host device 2 is also referred to as a host non-connected CM 11B.

As illustrated in FIG. 1, the CM 11A includes a CPU 12A, an FPGA 13A, a device 21A (Device#0), a device 19A (Device#1), a device 22A (Device#2), and a disk interface 23. Also, as illustrated in FIG. 1, the CM 11B includes a CPU 12B, an FPGA 13B, a device 21B (Device#0), a device 19B (Device#1), a device 22B (Device#2), and a disk interface 23.

Also, as illustrated in FIG. 2, each of the CMs 11A and 11B includes a power supply unit 31, a control unit 32, and a power supply factor 35.

The control unit 32 performs a control for realizing various functions as the CM 11. For example, the control unit 32 performs various controls, such as a control of access to the storage unit (not illustrated), according to the host I/O from the host device 2.

The power supply unit 31 supplies power to the respective units of the CM 11. The control unit 32 is supplied with power from the power supply unit 31.

Incidentally, hereinafter, as symbols indicating the CPUs, symbols 12A and 12B are used when it is necessary to specify one of a plurality of CPUs, and symbol 12 is used when an arbitrary CPU is indicated. Similarly, hereinafter, as symbols indicating the FPGAs, symbols 13A and 13B are used when it is necessary to specify one of a plurality of FPGAs, and symbol 13 is used when an arbitrary FPGA is indicated. Also, hereinafter, as symbols indicating the devices, symbols 21A, 22A, 19A, 21B, 22B, and 19B are used when it is necessary to specify one of a plurality of devices, and symbols 21, 22, and 19 are used when an arbitrary device is indicated.

The CPU 12 is a processor that performs various controls or arithmetic operations. The CPU 12 executes various functions, such as an RAID control, by executing a program stored in a memory (not illustrated) or the like.

The disk interface 23 is, for example, a SAS interface. The disk interface 23 is communicably connected to the storage device of the storage unit 20 or the like. Also, the disk interface 23 is connected to a communication path 51 and also functions as an interface unit that controls communication through the communication path 51. The communication path 51 communicably connects the disk interface 23 for the CM 11A and the SAS disk interface 23 for the CM 11B.

The device 19 is, for example, a solid state drive (SSD) and is used as a secondary cache of the CPU 12. In each of the CMs 11, the device 19 is connected to the device 21.

In the CM 11, the device 22 is a switching device, for example, a PCIe switch, which functions as a bridge connecting the CA 30, the CPU 12, and the disk interface 23.

In the CM 11A, the CPU 12, the host device 2, and the storage unit 20 are communicably connected through the device 22. That is, under the control of the CPU 12, data write or read is performed on the storage unit 20 through the device 22 and the disk interface 23 in response to the I/O request from the host device.

The devices 21A and 21B are interface units, for example, PCIe switches, which are connected to the communication paths 50 and 41 and control communication through the communication paths 50 and 41. The device 21A is provided in the CM 11A, and the device 21B is provided in the CM 11B. The devices 21A and 21B has substantially the same configuration.

The communication path (communication path between PCIe switches) 50 communicably connects the device 21A of the CM 11A and the device 21B of the CM 11B.

The FPGA 13 is a programmable integrated circuit (LSI) and realizes a function of matching power states between the CM 11A and the CM 11B.

As illustrated in FIG. 1, the FPGA 13 includes a power supply instruction monitoring block 14, a power control block 15, and an inter-FPGA communication control block 17.

The power control block 15 performs control on the power supply unit 31. The power control block 15 is a functional block that controls power on/off of the power supply unit 31, and performs a power supply instruction or a power interrupt instruction to the power supply unit 31.

As illustrated in FIG. 2, the power control block 15 includes a self-CM power state register 151, an other-CM power state register 152, and a timer 153.

The self-CM power state register 151 stores a value indicating the power state of the CM (self-CM) 11 including the corresponding FPGA 13. For example, "1" is stored when the power of the self-CM 11 is in an on state, and "0" is stored when the power of the self-CM 11 is in an off state.

The other-CM power state register 152 stores a value indicating the power state of the CM (other CM) 11 that is different from the CM 11 including the corresponding FPGA 13. For example, "1" is stored when the power of the other CM 11 is in an on state, and "0" is stored when the power of the other CM 11 is in an off state.

The setting (storing) of the values to the self-CM power state register 151 and the other-CM power state register 152 is controlled by the power control block 15.

The power control block 15 issues the power supply instruction to the power supply unit 31 when a "power-on instruction to self-CM" register 142 of the power supply instruction monitoring block 14, which is to be described below, is enabled.

Also, the power control block 15 receives a power state notification from the power supply unit 31 and reflects the contents of the power state notification to the self-CM power state register 151.

Furthermore, the power control block 15 receives the power state of the other CM from the inter-FPGA communication control block 17 and reflects the power state of the other CM to the other-CM power state register 152.

When a predetermined time (for example, 200 μsec) elapses after the "power-on instruction to self-CM" register 142 of the power supply instruction monitoring block 14 is enabled, the timer 153 issues the power supply instruction to the power supply unit 31. That is, the timer 153 delays the issue of the power supply instruction to the power supply unit 31 by a predetermined time.

Incidentally, it is preferable that the predetermined time counted by the timer 153 is, for example, more than or equal to a transmission interval (for example, 200 μsec) of the power-on instruction periodically transmitted from the CM 11 to the other CM 11. In particular, it is preferable that the predetermined time counted by the timer 153 is equal to the transmission interval of the power-on instruction.

The transmission interval of the power-on instruction is dependent on the specification of the inter-FPGA communication control block 17 of the FPGA 13 and is not different for each storage device. That is, since the transmission interval of the power-on instruction is a value common to the storage devices including the same FPGA 13, there is no need to adjust the transmission interval of the power-on instruction with respect to each storage device.

Incidentally, the effect obtained when the timer 153 delays the issue of the power supply instruction to the power supply unit 31 by the predetermined time will be described below with reference to FIG. 5.

The inter-FPGA communication control block 17 performs data communication between the CM 11A and the CM 11B. The inter-FPGA communication control block 17 is connected to the inter-FPGA communication control block 17 of the other CM 11 through the communication path 52 so as to be one-to-one communicable with each other.

The communication between the inter-FPGA communication control block 17 of the CM 11A and the inter-FPGA communication control block 17 of the CM 11B through the communication path 52 is performed even in a state in which the power supply from the power supply unit 31 to the control unit 32 in each CM 11 is stopped. Incidentally, it is preferable that the communication path 52 performs a protocol communication that is different from that of the above-described communication path 50.

The inter-FPGA communication control block 17 transmits the power-on instruction to the inter-FPGA communication control block 17 included in the other CM 11.

In a case where a "power-on instruction to other CM" register 143 of the power supply instruction monitoring block 14 is enabled and a power-off state is stored in the other-CM power state register 152 of the power control block 15, the inter-FPGA communication control block 17 periodically issues the power-on instruction to the other CM 11. Also, when the inter-FPGA communication control block 17 receives the power-on instruction from the other CM 11, the inter-FPGA communication control block 17 performs the notification of the receipt of the power-on instruction to a factor detection unit 141.

Furthermore, the inter-FPGA communication control block 17 notifies the value of the self-CM power state register 151 of the power control block 15 periodically (for example, every 200 μsec) to the other CM 11 as information indicating the power state of the self-CM.

On the other hand, the inter-FPGA communication control block 17 having received the value of the self-CM power state register 151 from the other CM 11 reflects the value to the other-CM power state register 152.

The power supply instruction monitoring block 14 monitors the input of the power supply instruction. The power supply instruction monitoring block 14 includes the factor detection unit 141, the "power-on instruction to self-CM" register 142, the "power-on instruction to other CM" register 143, and a "power-on instruction from other CM" register 144.

The "power-on instruction to self-CM" register 142 stores a value indicating the state of the power-on instruction to the power supply unit 31 of the CM (self-CM) 11 including the corresponding FPGA 13. For example, "1" is stored when the power-on instruction to the power supply unit 31 of the self-CM 11 is in an issued (enabled) state, and "0" is stored when which the power-on instruction to the power supply unit 31 of the self-CM 11 is in a non-issued (disabled) state.

The "power-on instruction to other CM" register 143 stores a value indicating the state of the power-on instruction to the power supply unit 31 of the CM (other CM) 11 that is different from the CM 11 including the corresponding FPGA 13. For example, "1" is stored when the power-on instruction to the power supply unit 31 of the other CM 11 is in an issued (enabled) state, and "0" is stored when the power-on instruction to the power supply unit 31 of the other CM 11 is in a non-issued (disabled) state.

Also, the "power-on instruction to other CM" register 143 is disabled ("0") when the "power-on instruction from other CM" register 144, which is to be described below, is enabled.

The "power-on instruction from other CM" register 144 is a register that indicates the state of whether the power-on instruction is received from the other CM 11. When the inter-FPGA communication control block 17 receives the power-on instruction from the other CM 11, the "power-on instruction from other CM" register 144 is enabled and, for example, "1" is set. Also, when the inter-FPGA communication control block 17 does not receive the power-on instruction from the other CM 11, the "power-on instruction from other CM" register 144 is disabled and, for example, "0" is set.

Also, when the self-CM power state register 151 of the power control block 15 is in a power-on state, the "power-on instruction from other CM" register 144 is disabled and, for example, "0" is set.

Therefore, the power supply instruction monitoring block 14 ("power-on instruction from other CM" register 144) functions as a monitoring unit that monitors the reception of the power-on instruction from the CM 11A (second control device) among the plurality of CMs 11.

In this manner, the setting (storing) of the respective values to the "power-on instruction to self-CM" register 142, the "power-on instruction to other CM" register 143, and the "power-on instruction from other CM" register 144 is controlled by the power supply instruction monitoring block 14.

The power-on instruction from the host device 2 or the power supply factor 35 of the self-CM 11 is input to the factor detection unit 141. Incidentally, the power supply factor 35 indicates that there is the factor of the power supply in the self-CM 11 and corresponds to, for example, power on by an input of a power switch or a restart.

In a case where the value of the self-CM power state register 151 of the power control block 15 indicates the power off, when the input of the power-on instruction from the host device 2 or the power supply factor 35 is detected, the factor detection unit 141 enables the "power-on instruction to self-CM" register 142 and the "power-on instruction to other CM" register 143. That is, "1" is set to the registers 142 and 143.

Also, in a case where the self-CM power state register 151 of the power control block 15 is in a power-off state, when the power-on instruction from the other CM 11 is received, the factor detection unit 141 enables only the "power-on instruction to self-CM" register 142.

Furthermore, when the other-CM power state register 152 of the power control block 15 changes from the disabled state to the enabled state, the factor detection unit 141 disables the "power-on instruction to other CM" register 143.

Also, when the "power-on instruction from other CM" register 144 is enabled, the factor detection unit 141 enables the "power-on instruction to self-CM" register 142.

Furthermore, when the "power-on instruction from other CM" register 144 is enabled, the factor detection unit 141 enables the "power-on instruction to other CM" register 143. Therefore, when the power supply instruction monitoring block 14 (factor detection unit 141) detects the power-on instruction from the other CM (second control device) 11A, the power supply instruction monitoring block 14 (factor detection unit 141) functions as a prevention unit that prevents the issue of the power-on instruction to the other CM 11A.

The restart process of the storage device 1 configured as described above as an example of an embodiment will be described with reference to the flowcharts illustrated in FIGS. 3 and 4 (steps A101 to A115 and B101 to B115).

Figure 3:
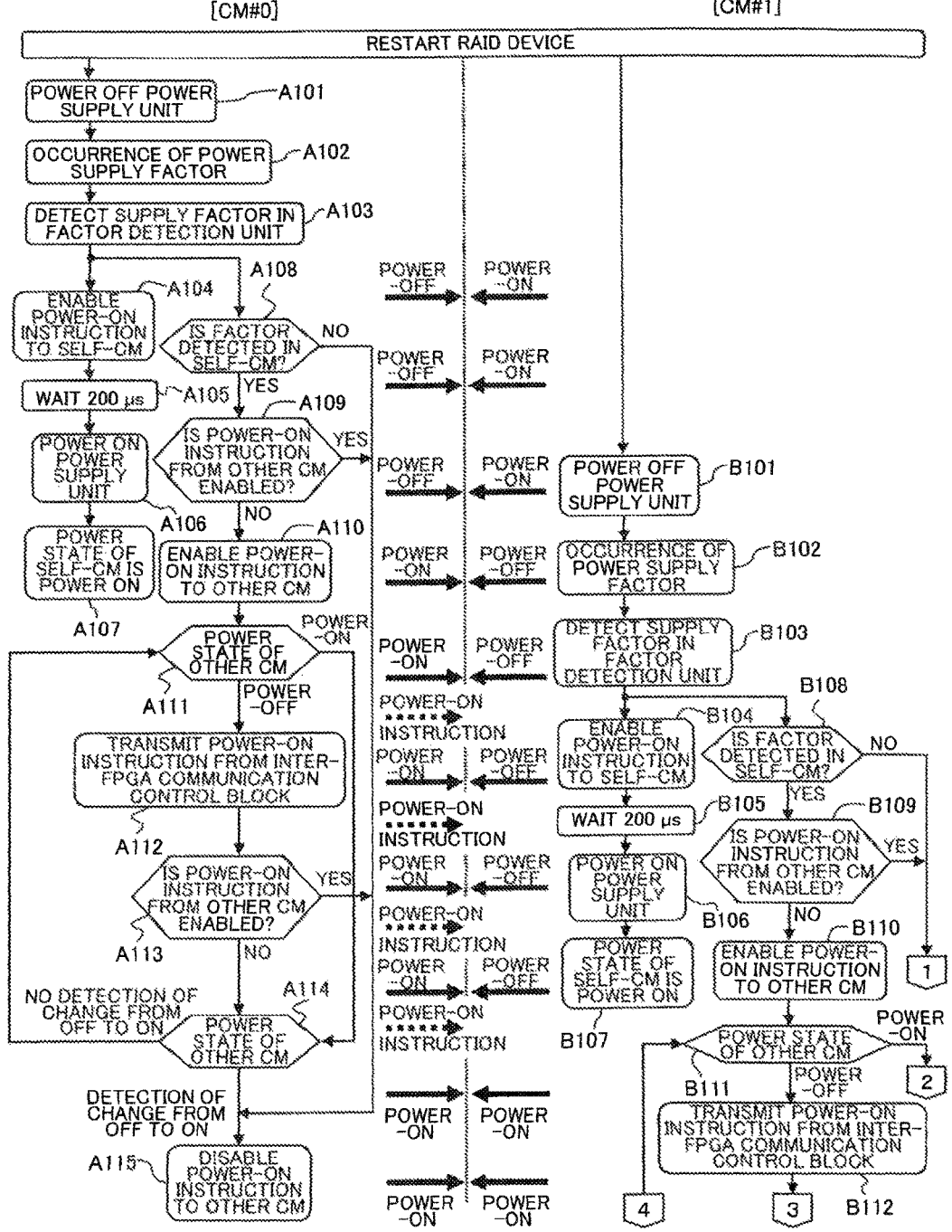
FIG. 3 is a flowchart describing a restarting process of a storage device as an example of an embodiment.
Figure 4:
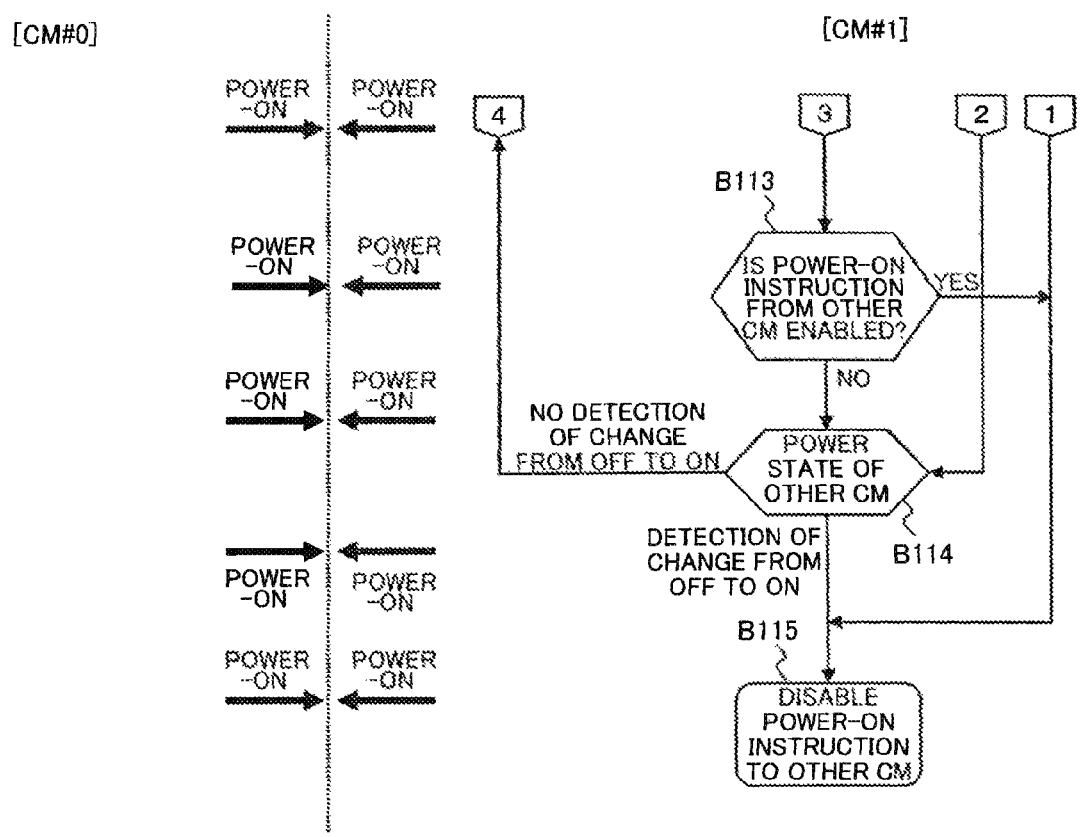
FIG. 4 is a flowchart describing a restarting process of a storage device as an example of an embodiment.

In FIGS. 3 and 4, the process of the CM#0 is illustrated on the left side, and the process of the CM#1 is illustrated on the right side. Also, in FIGS. 3 and 4, the information indicating the power state of the self-CM, which is transmitted from the inter-FPGA communication control block 17 of each CM 11 to the other CM 11, is indicated by a thick solid arrow. Furthermore, in FIGS. 3 and 4, the power-on instruction, which is transmitted from the inter-FPGA communication control block 17 of the CM#0 to the CM#1, is indicated by a thick dashed arrow.

In the restart of the storage device 1, first, in step A101, since the power supply unit 31 of the CM#0 is in a power-off state, the power supply to the control unit 32 is stopped.

In step A102, the power supply factor 35 occurs due to the restart, and in step A103, the factor detection unit 141 of the CM#0 detects the power-on instruction from the power supply factor 35.

In step A104, the factor detection unit 141 enables the "power-on instruction to self-CM" register 142. In step A105, the timer 153 performs a time measurement during a predetermined time (for example, 200 μsec). When the timer 153 measures that the time has elapsed the predetermined time (200 μsec), the power supply instruction is issued to the power supply unit 31.

In step A106, the power supply unit 31 supplies power according to the power supply instruction, and supplies power to the control unit 32. Also, the power supply unit 31 notifies the power-on state to the power control block 15. In step A107, "1" indicating the power-on state is stored in the self-CM power state register 151 of the power control block 15.

Also, the information indicating the power state of the self-CM, which is notified from the inter-FPGA communication control block 17 of the CM#0 to the inter-FPGA communication control block 17 of the CM#1, is switched from "power off" to "power on". Also, based on this, the "power-on instruction from other CM" register 144 is also disabled.

Incidentally, the information indicating the power state of the self-CM, which is notified from the other CM 11 (CM#1), is stored in the other-CM power state register 152 of the power control block 15.

Also, in parallel to step A104 described above, in step A108, the factor detection unit 141 checks whether the power-on instruction is performed by the detection of the factor in the self-CM, that is, whether the power-on instruction is input from the power supply factor 35.

In a case where the power-on instruction is not input from the power supply factor 35 (see NO route of step A108), in step A115, the factor detection unit 141 disables the "power-on instruction to other CM" register 143. Therefore, the transmission of the power-on instruction from the inter-FPGA communication control block 17 of the CM#0 to the inter-FPGA communication control block 17 of the CM#1 is stopped.

In a case where the power-on instruction is input from the power supply factor 35 (see YES route of step A108), in step A109, the power supply instruction monitoring block 14 checks whether the "power-on instruction from other CM" register 144 is enabled.

In a case where the "power-on instruction from other CM" register 144 is enabled (see YES route of step A109), in step A115, the factor detection unit 141 disables the "power-on instruction to other CM" register 143. Therefore, the transmission of the power-on instruction from the inter-FPGA communication control block 17 of the CM#0 to the inter-FPGA communication control block 17 of the CM#1 is stopped. In addition, the "power-on instruction to self-CM" register 142 is enabled.

In a case where the "power-on instruction from other CM" register 144 is disabled (see NO route of step A109), in step A110, the factor detection unit 141 enables the "power-on instruction to other CM" register 143.

Subsequently, in step A111, the power control block 15 checks the power state of the other CM 11 by checking the other-CM power state register 152.

As the checking result, in a case where the power state of the other CM 11 is off (see "power off" route of step A111), in step A112, the power-on instruction from the inter-FPGA communication control block 17 of the CM#0 to the inter-FPGA communication control block 17 of the CM#1 is started.

Subsequently, in step A113, the power supply instruction monitoring block 14 checks whether the "power-on instruction from other CM" register 144 is enabled.

In a case where the "power-on instruction from other CM" register 144 is enabled (see YES route of step A113), in step A115, the factor detection unit 141 disables the "power-on instruction to other CM" register 143. Therefore, the transmission of the power-on instruction from the inter-FPGA communication control block 17 of the CM#0 to the inter-FPGA communication control block 17 of the CM#1 is stopped. In addition, the "power-on instruction to self-CM" register 142 is enabled.

On the other hand, in a case where the "power-on instruction from other CM" register 144 is disabled (see NO route of step A113), in step A114, the power control block 15 checks the power state of the other CM 11 by checking the other-CM power state register 152. That is, it is checked whether the power state of the other CM 11 is changed to the on state.

Also, as the checking result of step A111, in a case where the power state of the other CM 11 is on (see "power on" route of step A111), in step A114, the power state of the other CM 11 is check again.

In a case where the power state of the other CM 11 is changed to the on state (see "detection of change from off to on" route of step A114), in step A115, the factor detection unit 141 disables the "power-on instruction to other CM" register 143. Therefore, the transmission of the power-on instruction from the inter-FPGA communication control block 17 of the CM#0 to the inter-FPGA communication control block 17 of the CM#1 is stopped. In addition, the "power-on instruction to self-CM" register 142 is enabled.

Also, in a case where the power state of the other CM 11 is not changed from off to on (see "no detection of change from off to on" route of step A114), the process returns to step A111.

On the other hand, in the CM#1, in step B101, the power supply unit 31 of the CM#1 becomes a power-off state and stops the power supply to the control unit 32.

Subsequently, in step B102, the power supply factor 35 occurs due to the restart, and in step B103, the factor detection unit 141 of the CM#1 detects the power-on instruction from the power supply factor 35.

In step B104, the factor detection unit 141 enables the "power-on instruction to self-CM" register 142. In step B105, the timer 153 performs a time measurement during a predetermined time (for example, 200 μsec). When the timer 153 measures that the time has elapsed the predetermined time (200 μsec), the power supply instruction is issued to the power supply unit 31.

In step B106, the power supply unit 31 of the CM#1 supplies power according to the power supply instruction from the power control block 15, and supplies power to the control unit 32. Also, the power supply unit 31 notifies the power-on state to the power control block 15. In step B107, "1" indicating the power-on state is stored in the self-CM power state register 151 of the power control block 15.

Also, the information indicating the power state of the self-CM, which is notified from the inter-FPGA communication control block 17 of the CM#1 to the inter-FPGA communication control block 17 of the CM#0, is switched from "power off" to "power on".

Also, in parallel to step B104 described above, in step B108, the factor detection unit 141 checks whether the power-on instruction is performed by the detection of the factor in the self-CM, that is, whether the power-on instruction is input from the power supply factor 35.

In a case where the power-on instruction is not input from the power supply factor 35 (see NO route of step B108), in step B115, the factor detection unit 141 disables the "power-on instruction to other CM" register 143.

In a case where the power-on instruction is input from the power supply factor 35 (see YES route of step B108), in step B109, the power supply instruction monitoring block 14 checks whether the "power-on instruction from other CM" register 144 is enabled.

In a case where the "power-on instruction from other CM" register 144 is enabled (see YES route of step B109), in step B115, the factor detection unit 141 disables the "power-on instruction to other CM" register 143. Therefore, in the CM#1, the issue of the power-on instruction to the CM#0 is suppressed. Therefore, even in a case where the power off is performed after the restart of the storage device 1, it is possible to prevent the occurrence of unintended power on of the CM#0 during the power-off process, because the power-on instruction from the CM#1 to the CM#0 is not transferred. In addition, the "power-on instruction to self-CM" register 142 is enabled.

On the other hand, in a case where the "power-on instruction from other CM" register 144 is disabled (see NO route of step B109), in step B110, the factor detection unit 141 enables the "power-on instruction to other CM" register 143.

Subsequently, in step B111, the power control block 15 checks the power state of the other CM 11 by checking the other-CM power state register 152.

As the checking result, in a case where the power state of the other CM 11 is off (see "power off" route of step B111), in step B112, the power-on instruction from the inter-FPGA communication control block 17 of the CM#1 to the inter-FPGA communication control block 17 of the CM#0 is started.

Subsequently, in step B113, the power supply instruction monitoring block 14 checks whether the "power-on instruction from other CM" register 144 is enabled.

In a case where the "power-on instruction from other CM" register 144 is enabled (see YES route of step B113), in step B115, the factor detection unit 141 disables the "power-on instruction to other CM" register 143. Therefore, the transmission of the power-on instruction from the inter-FPGA communication control block 17 of the CM#0 to the inter-FPGA communication control block 17 of the CM#1 is stopped. In addition, the "power-on instruction to self-CM" register 142 is enabled.

On the other hand, in a case where the "power-on instruction from other CM" register 144 is disabled (see NO route of step B113), in step B114, the power control block 15 checks the power state of the other CM 11 by checking the other-CM power state register 152. That is, it is checked whether the power state of the other CM 11 is changed to the on state.

Also, as the checking result of step B111, in a case where the power state of the other CM 11 is on (see "power on" route of step B111), in step B114, the power state of the other CM 11 is checked again.

In a case where the power state of the other CM 11 is changed to the on state (see "detection of change from off to on" route of step B114), in step B115, the factor detection unit 141 disables the "power-on instruction to other CM" register 143. Therefore, the transmission of the power-on instruction from the inter-FPGA communication control block 17 of the CM#0 to the inter-FPGA communication control block 17 of the CM#1 is stopped. In addition, the "power-on instruction to self-CM" register 142 is enabled.

Also, in a case where the power state of the other CM 11 is not changed from off to on (see "no detection of change from off to on" route of step B114), the process returns to step B111.

Therefore, according to the storage device 1 as an example of an embodiment, the "power-on instruction from other CM" register 144 is provided in the power supply instruction monitoring block 14, and the "power-on instruction from other CM" register 144 is enabled when the power-on instruction is received from the other CM 11. When the "power-on instruction from other CM" register 144 is enabled, the "power-on instruction to other CM" register 143 is disabled.

Therefore, it is possible to suppress the notification of the power-on instruction to the other CM 11. For example, in a case where the power off is performed after the restart process of the storage device 1, it is possible to prevent the other CM 11 from receiving the power-on instruction and it is possible to prevent the unintended start of the CM 11 during the power-off process.

Also, the timer 153 is provided in the power control block 15 of the host connected CM 11A. When a predetermined time elapses after the "power-on instruction to self-CM" register 142 of the power supply instruction monitoring block 14 is enabled, the timer 153 issues the power supply instruction to the power supply unit 31.

Also, the predetermined time is set to be more than or equal to a transmission interval (for example, 200 μsec) of the power-on instruction periodically transmitted to the other CM 11 by the inter-FPGA communication control block 17 of the host connected CM 11A.

Therefore, before the host non-connected CM 11B becomes a power-on state, the host non-connected CM 11B can receive the power-on instruction from the host connected CM 11A at least one time. That is, the host non-connected CM 11B can receive the power-on instruction from the host connected CM 11A, and the "power-on instruction to other CM" register 143 that is enabled in the host non-connected CM 11B can be disabled (cleared). Therefore, it is possible to prevent the power-on instruction to the CM 11A from being continuously reserved in the CM 11B.

Figure 5:
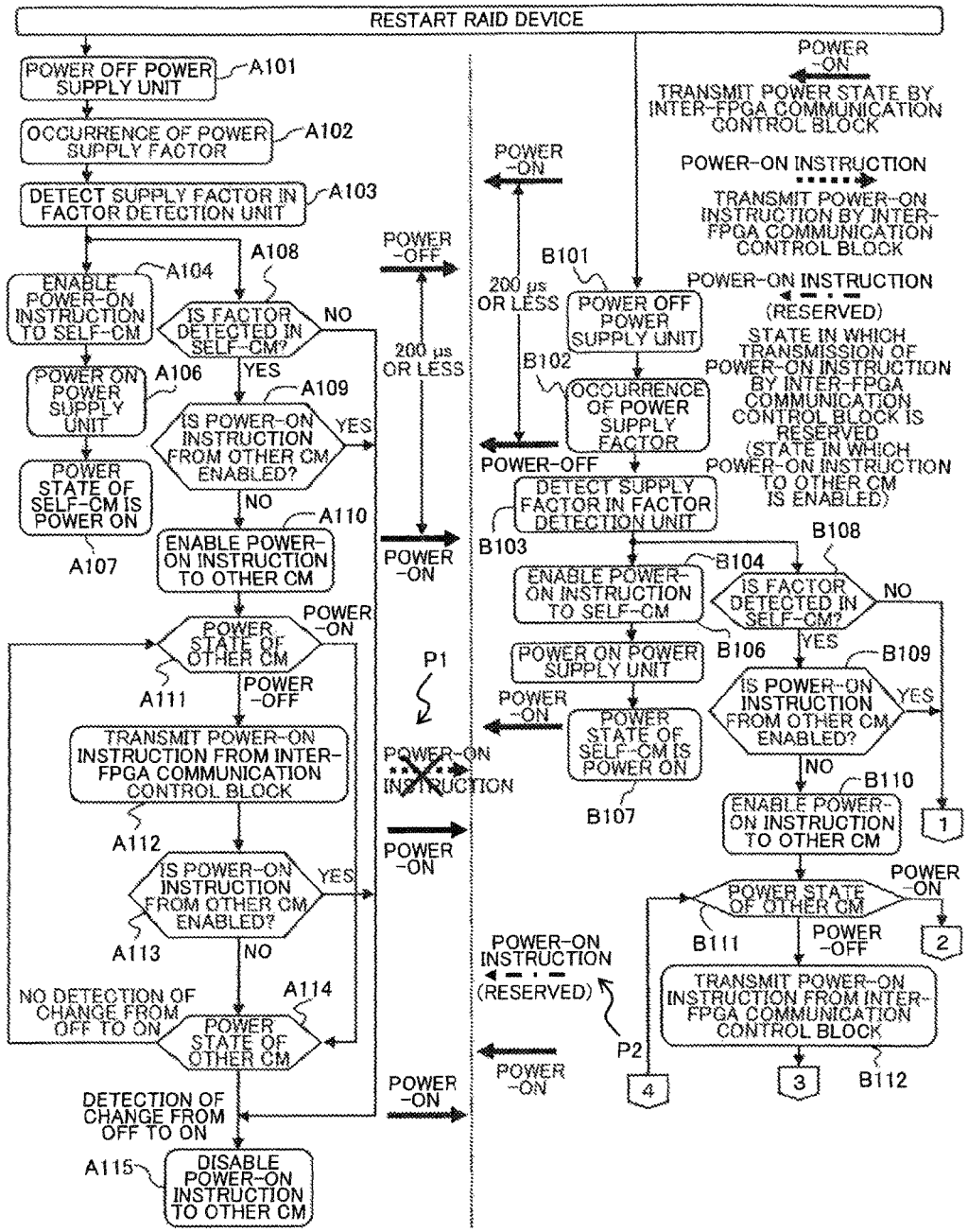
FIG. 5 is a flowchart describing an effect of a timer of a storage device as an example of an embodiment.
Figure 6:
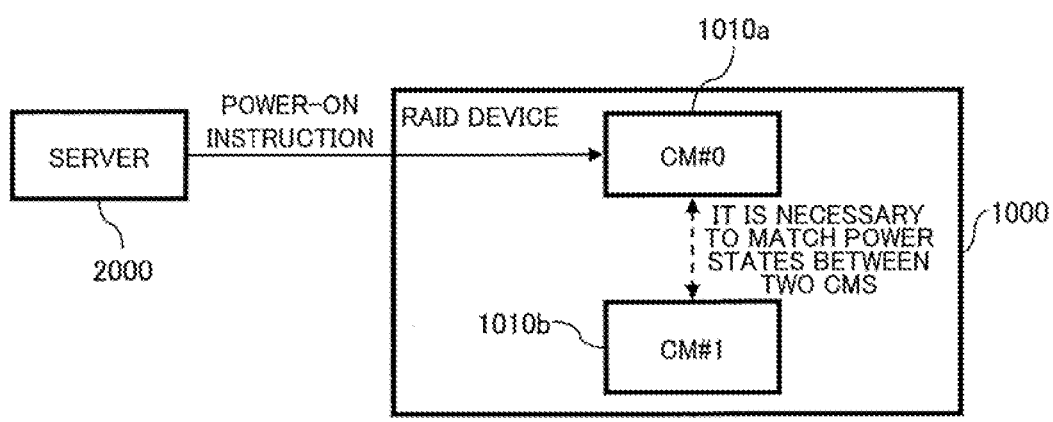
FIG. 6 is a diagram illustrating an example of a connection with a server in a general RAID device.

FIG. 5 is a flowchart describing the effect of the timer 153 of the storage device 1 as an example of an embodiment. In FIG. 5, steps A105 and B105 of the flowchart illustrated in FIG. 3 are eliminated. Hereinafter, in the drawing, since the same reference numerals and symbols as those described above indicate the same processes, a description thereof will be omitted.

In the example illustrated in FIG. 5, the description will be given of the case where the power supply instruction is issued to the power supply unit 31, without the time measurement of 200 μsec by the timer 153 after the "power-on instruction to self-CM" register 142 is enabled.

When the CM#0 issues the power-on instruction (see step A112), the power of the CM#1 is supplied. Thus, when the power state is transmitted from the CM#1, the CM#0 detects that the power state of the CM#1 is changed from power off to power on. Therefore, in the CM#0, the power-on instruction to the CM#1 is cleared (see symbol P1).

Therefore, after that, the CM#1 does not find the condition that disables (clears) the enabled "power-on instruction to other CM" register 143. That is, it becomes a state in which the issue of the power-on instruction to the CM#0 is reserved (see symbol P2).

Therefore, when the storage device 1 becomes a power-off state next time, it is detected that the power state of the CM#0 in a power-off state, and the power-on instruction is issued to the CM#0. Thus, the CM#0 is unintentionally power on.

In the storage device 1, as illustrated in step A105 of FIG. 3, when the time measurement of 200 μsec (after delay) by the timer 153 elapses after the "power-on instruction to self-CM" register 142 is enabled, the power supply instruction is issued to the power supply unit 31. Therefore, before the power-on instruction is transmitted to the other CM 11, it is guaranteed that the power-on instruction from the other CM 11 can be surely received one time. In the CM#1, it is possible to prevent the issue of the power-on instruction to the CM#0 from being continuously reserved.

Before the CM#1 becomes a power-off state, if the power-on instruction can be received from the CM#0, the "power-on instruction to other CM" register 143 of the CM#1 at that time point can be disabled (cleared). Thus, it is possible to prevent the power-on instruction to the CM#0 from being continuously reserved in the CM#1.

In the CM#0, the power supply instruction is issued to the power supply unit 31 by delaying 200 μsec after the "power-on instruction to self-CM" register 142 is enabled. In the CM#1, it is possible to surely detect the change from power off to power on in the CM#0.

Therefore, the CM#1 can cancel the notification of the power-on instruction to the CM#0. It is possible to prevent the power-on instruction from the CM#1 to the CM#0 from being kept on (it is possible to prevent the power-on instruction from being continuously reserved). Therefore, it is possible to prevent the power of the CM#0 from being unintentionally turned on by the reception of the power-on instruction from the CM#1.

For comparison, a method of matching power between CMs 101a and 101b in a storage device 100 having no power matching function of the above-described storage device 1 will be described below.

Figure 7:
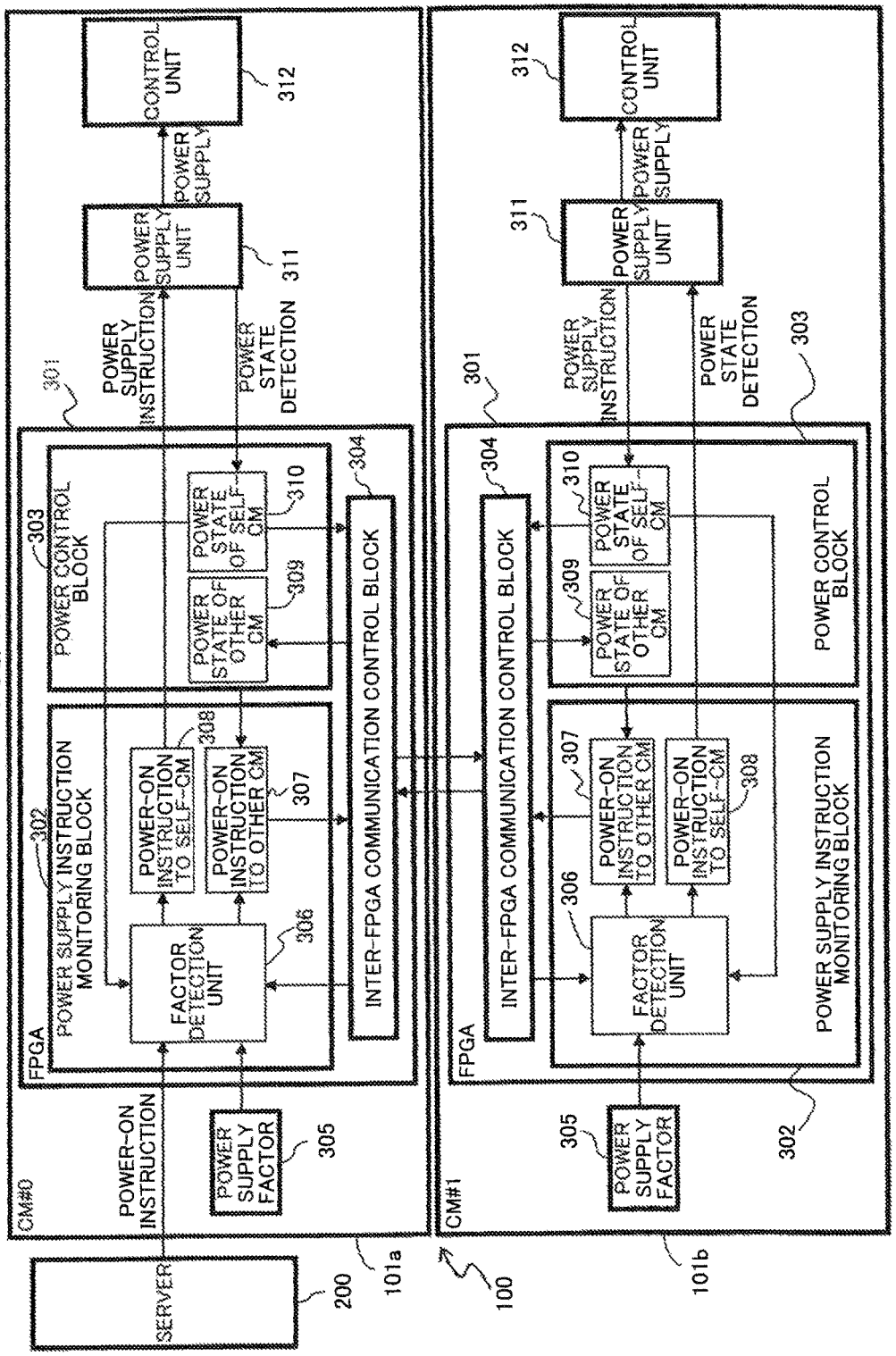
FIG. 7 is a schematic diagram illustrating a power control function of a storage device that is different from a storage device as an example of an embodiment.

FIG. 7 is a schematic diagram illustrating a power control function of a storage device 100 that is different from a storage device as an example of an embodiment. As illustrated in FIG. 7, in the storage device 100, each of CMs 101a and 101b includes an FPGA 301, a power supply unit 311, and a control unit 312. Hereinafter, as symbols indicating the CMs, symbols 101a and 101b are used when it is necessary to specify one of a plurality of CMs, and symbol 101 is used when an arbitrary CM is indicated. Also, hereinafter, the CM 101a may also be indicated as CM#0, and the CM 101b may also be indicated as CM#1.

The storage device 100 does not include the "power-on instruction from other CM" register 144 or the timer 153 and does not have the power matching function of the above-described storage device 1.

The control unit 312 performs a control for realizing various functions as the CM. For example, the control unit 312 performs various controls, such as a control of access to a storage unit (not illustrated), according to a host I/O from a server 200.

The power supply unit 311 supplies power to the respective units of the CMs 101a and 101b. The control unit 312 is supplied with power from the power supply unit 311.

The FPGA 301 is a programmable integrated circuit (LSI) and performs power matching on the CMs 101a and 101b.

As illustrated in FIG. 7, the FPGA 301 includes a power supply instruction monitoring block 302, a power control block 303, and an inter-FPGA communication control block 304.

The power control block 303 is a functional block that controls the power supply of the power supply unit 311, and performs a power supply instruction to the power supply unit 311.

The power control block 303 includes a self-CM power state register 310 and an other-CM power state register 309.

The self-CM power state register 310 stores a value indicating a power state of the CM (self-CM) 101 including the corresponding FPGA 301. For example, "1" is stored when the power of the self-CM 101 is in an on state, and "0" is stored when the power of the self-CM 101 is in an off state.

The other-CM power state register 309 stores a value indicating the power state of the CM (other CM) 101 that is different from the CM 101 including the corresponding FPGA 301. For example, "1" is stored when the power of the other CM 101 is in an on state, and "0" is stored when the power of the other CM 101 is in an off state.

The power control block 303 issues the power supply instruction to the power supply unit 311 when a "power-on instruction to self-CM" register 308 of the power supply instruction monitoring block 302 is enabled.

Also, the power control block 303 receives a power state notification from the power supply unit 311 and reflects the contents of the power state notification to the self-CM power state register 310.

Furthermore, the power control block 303 receives the power state of the other CM from the inter-FPGA communication control block 304 and reflects the power state of the other CM to the other-CM power state register 309.

The inter-FPGA communication control block 304 performs data communication between the CM 101a and the CM 101b. The inter-FPGA communication control block 304 transmits, for example, the information indicating the power state of the self-CM periodically (for example, every 200 μsec) to the inter-FPGA communication control block 304 provided in the other CM 101. Also, the inter-FPGA communication control block 304 transmits the power-on instruction to the inter-FPGA communication control block 304 included in the other CM 101.

In a case where the "power-on instruction to other CM" register 307 of the power supply instruction monitoring block 302 is enabled, the inter-FPGA communication control block 304 periodically issues the power-on instruction to the other CM 101. Also, when the inter-FPGA communication control block 304 receives the power-on instruction from the other CM 101, the inter-FPGA communication control block 304 performs the notification of the effect to a factor detection unit 306.

Furthermore, the inter-FPGA communication control block 304 periodically notifies the other CM 101 of the value of the self-CM power state register 310 of the power control block 303.

On the other hand, the inter-FPGA communication control block 304 having received the value of the self-CM power state register 310 from the other CM 101 reflects the value to the other-CM power state register 309.

The power supply instruction monitoring block 302 monitors the input of the power supply instruction. The power supply instruction monitoring block 302 includes a factor detection unit 306, a "power-on instruction to self-CM" register 308, and a "power-on instruction to other CM" register 307.

The "power-on instruction to self-CM" register 308 stores a value indicating the state of the power-on instruction to the power supply unit 311 of the CM (self-CM) 101 including the corresponding FPGA 301. For example, "1" is stored when the power-on instruction to the power supply unit 311 of the self-CM 101 is in an issued (enabled) state, and "0" is stored when the power-on instruction to the power supply unit 311 of the self-CM 101 is in a non-issued (disabled) state.

The "power-on instruction to other CM" register 307 stores a value indicating the state of the power-on instruction to the power supply unit 311 of the CM (other CM) 101 that is different from the CM 101 including the corresponding FPGA 301. For example, "1" is stored when the power-on instruction to the power supply unit 311 of the other CM 101 is in an issued (enabled) state, and "0" is stored when the power-on instruction to the power supply unit 311 of the other CM 101 is in a non-issued (disabled) state.

The power-on instruction from the server 200 or the power supply factor 305 of the self-CM 101 is input to the factor detection unit 306. Incidentally, the power supply factor 305 indicates that there is the factor of the power supply in the self-CM 101 and corresponds to, for example, power on by an input of a power switch or a restart.

In a case where the value of the self-CM power state register 310 of the power control block 303 indicates the power off, when the input of the power-on instruction from the server 200 or the power supply factor 305 is detected, the factor detection unit 306 enables the "power-on instruction to self-CM" register 308 and the "power-on instruction to other CM" register 307. That is, "1" is set to the registers 308 and 307.

Also, in a case where the self-CM power state register 310 of the power control block 303 is in a power-off state, when the power-on instruction from the other CM 101 is received, the factor detection unit 306 enables only the "power-on instruction to self-CM" register 308.

Furthermore, when the other-CM power state register 309 of the power control block 303 changes from the disabled state to the enabled state, the factor detection unit 306 disables the "power-on instruction to other CM" register 307.

Next, a method of matching power between the CMs of the storage device 100 that is different from the storage device as an example of an embodiment will be described with reference to the flowchart illustrated in FIG. 8 (steps A1 to A9 and B1 to B10).

Figure 8:
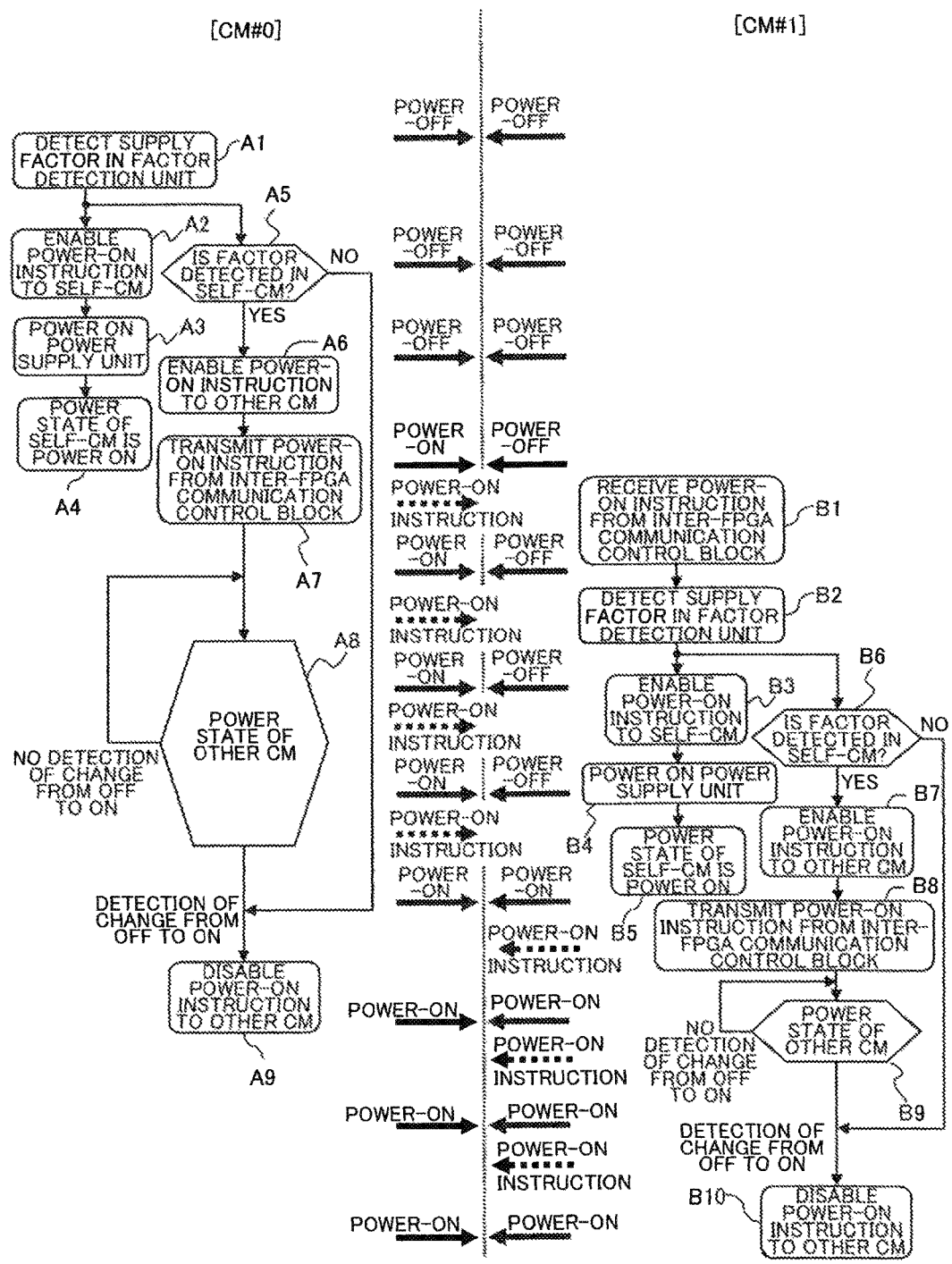
FIG. 8 is a flowchart describing a method of matching power between CMs in a storage device that is different from a storage device as an example of an embodiment.

In FIG. 8, the process of the CM#0 is illustrated on the left side, and the process of the CM#1 is illustrated on the right side. Also, in FIG. 8, the information indicating the power state of the self-CM, which is transmitted from the inter-FPGA communication control block 304 of each CM 101 to the other CM 101, is indicated by a thick solid line. Furthermore, in FIG. 8, the power-on instruction, which is transmitted from the inter-FPGA communication control block 304 of the CM#0 to the CM#1, is indicated by a thick dashed arrow.

When the factor detection unit 306 of the CM#0 detects the power-on instruction from the power supply factor 305 in step A1, the factor detection unit 306 of the CM#0 enables the "power-on instruction to self-CM" register 308 in step A2.

In step A3, the power supply unit 311 supplies power according to the power supply instruction from the power control block 303, and supplies power to the control unit 312. Also, the power supply unit 311 notifies the power-on state to the power control block 303. In step A4, "1" indicating the power-on state is stored in the self-CM power state register 310 of the power control block 303.

Also, the information indicating the power state of the self-CM, which is notified from the inter-FPGA communication control block 304 of the CM#0 to the inter-FPGA communication control block 304 of the CM#1, is switched from "power off" to "power on". Incidentally, the information indicating the power state of the self-CM, which is notified from the other CM 101, is stored in the other-CM power state register 309 of the power control block 303.

Also, in parallel to step A2 described above, in step A5, the factor detection unit 306 checks whether the power-on instruction is performed by the detection of the factor in the self-CM, that is, whether the power-on instruction is input from the power supply factor 305.

In a case where the power-on instruction is not input from the power supply factor 305 (see NO route of step A5), in step A9, the factor detection unit 306 disables the "power-on instruction to other CM" register 307.

In a case where the power-on instruction is input from the power supply factor 305 (see YES route of step A5), in step A6, the factor detection unit 306 enables the "power-on instruction to other CM" register 307. Therefore, in step A7, the transmission of the power-on instruction from the inter-FPGA communication control block 304 of the CM#0 to the inter-FPGA communication control block 304 of the CM#1 is started.

In step A8, the power control block 303 of the CM#0 checks the power state of the other CM 101 by checking the other-CM power state register 309. That is, the power control block 303 checks whether the power state of the other CM 101 is changed from off to on.

In a case where the power state of the other CM 101 is not changed from off (see "no detection of change from off to on" route of step A8), step A8 is repeated.

In a case where it is detected that the power state of the other CM 101 is changed from off to on (see "detection of change from off to on" route of step A8), the process proceeds to step A9 and the factor detection unit 306 disables the "power-on instruction to other CM" register 307.

Therefore, the transmission of the power-on instruction from the inter-FPGA communication control block 304 of the CM#0 to the inter-FPGA communication control block 304 of the CM#1 is stopped.

On the other hand, in step B1, the inter-FPGA communication control block 304 of the CM#1 receives the power-on instruction transmitted from the inter-FPGA communication control block 304 of the CM#0. Therefore, in step B2, the factor detection unit 306 detects the power-on instruction.

In step B3, the factor detection unit 306 of the CM#1 enables the "power-on instruction to self-CM" register 308.

In step B4, the power supply unit 311 of the CM#1 supplies power according to the power supply instruction from the power control block 303, and supplies power to the control unit 312. Also, the power supply unit 311 notifies the power-on state to the power control block 303. In step B5, "1" indicating the power-on state is stored in the self-CM power state register 310 of the power control block 303.

Also, the information indicating the power state of the self-CM, which is notified from the inter-FPGA communication control block 304 of the CM#1 to the inter-FPGA communication control block 304 of the CM#0, is switched from "power off" to "power on".

Also, in parallel to step B3 described above, in step B6, the factor detection unit 306 checks whether the power-on instruction is performed by the detection of the factor in the self-CM, that is, whether the power-on instruction is input from the power supply factor 305.

In a case where the power-on instruction is not input from the power supply factor 305 (see NO route of step B6), in step B10, the factor detection unit 306 disables the "power-on instruction to other CM" register 307.

In a case where the power-on instruction is input from the power supply factor 305 (see YES route of step B6), in step B7, the factor detection unit 306 enables the "power-on instruction to other CM" register 307. Therefore, in step B8, the transmission of the power-on instruction from the inter-FPGA communication control block 304 of the CM#1 to the inter-FPGA communication control block 304 of the CM#0 is started.

In step B9, the power control block 303 of the CM#1 checks the power state of the other CM 101 by checking the other-CM power state register 309. That is, the power control block 303 checks whether the power state of the other CM 101 is changed from off to on.

In a case where the power state of the other CM 101 is not changed from off (see "no detection of change from off to on" route of step B9), step B9 is repeated.

In a case where it is detected that the power state of the other CM 101 is changed from off to on (see "detection of change from off to on" route of step B9), the process proceeds to step B10 and the factor detection unit 306 disables the "power-on instruction to other CM" register 307.

Therefore, the transmission of the power-on instruction from the inter-FPGA communication control block 304 of the CM#0 to the inter-FPGA communication control block 304 of the CM#1 is stopped.

Figure 9:
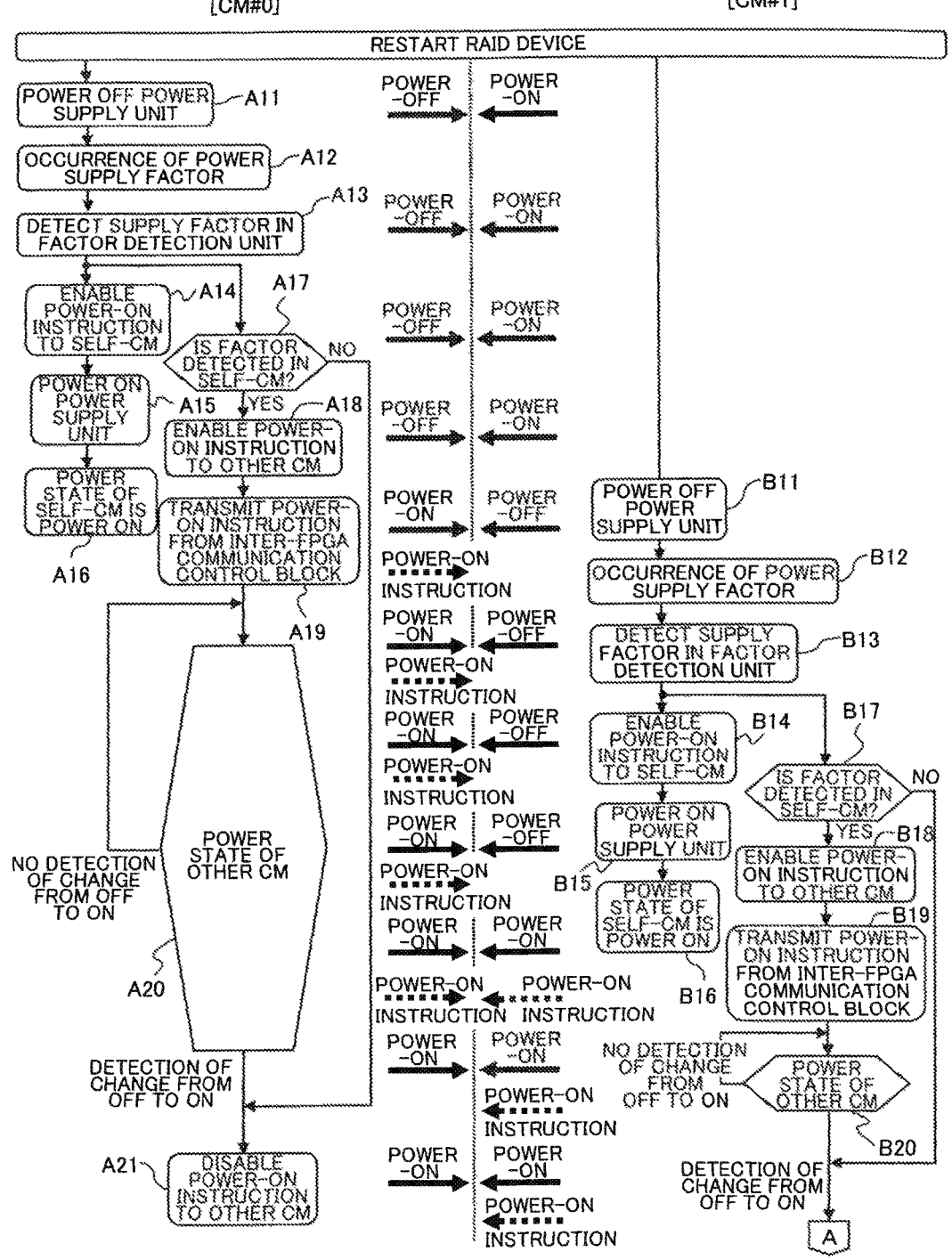
FIG. 9 is a flowchart illustrating a restarting process of a storage device that is different from a storage device as an example of an embodiment.
Figure 10:
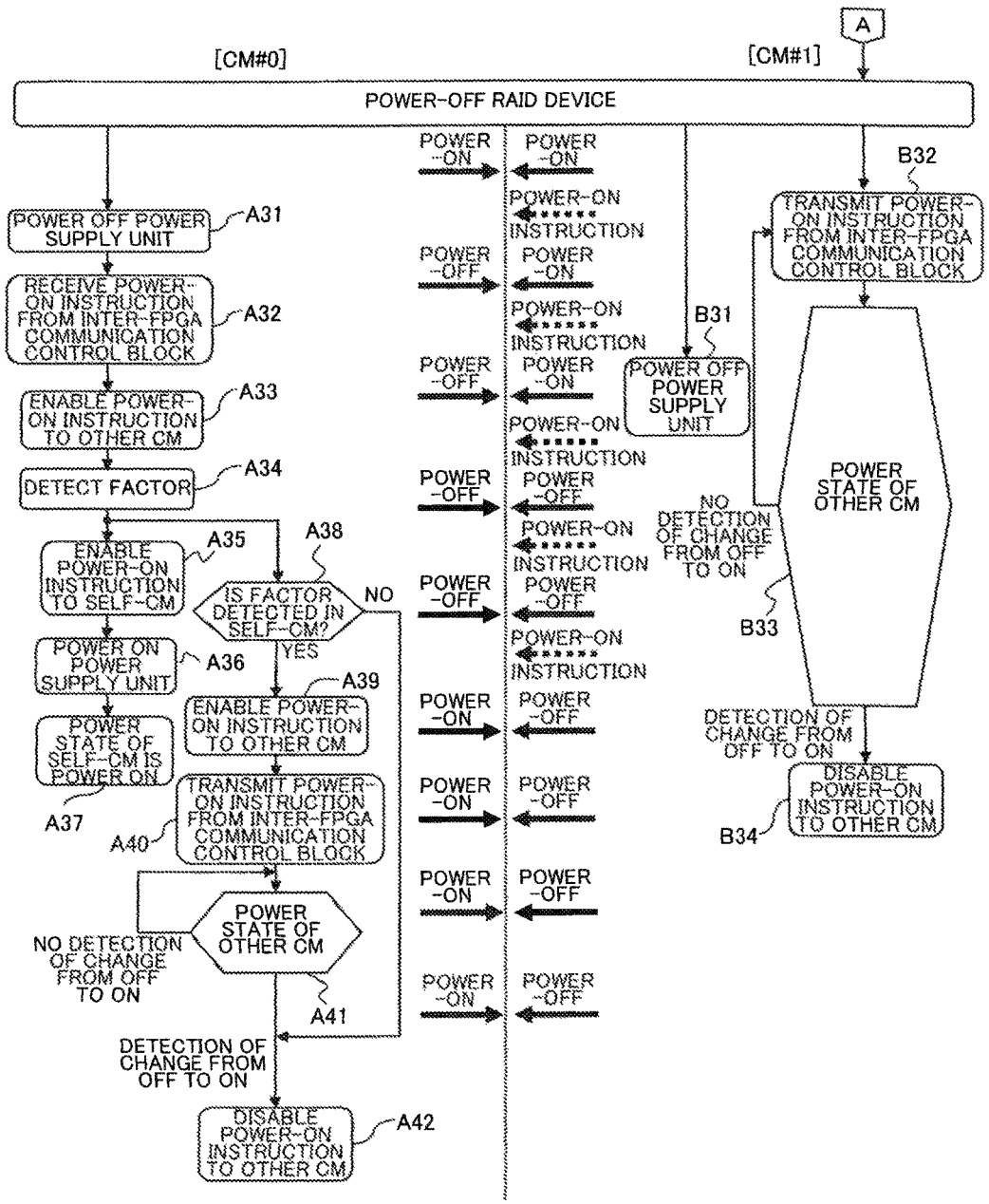
FIG. 10 is a flowchart illustrating a power-off process of a storage device that is different from a storage device as an example of an embodiment.

FIG. 9 is a flowchart illustrating a restart process of a storage device that is different from the storage device as an example of an embodiment (steps A11 to A21 and B11 to B20), and FIG. 10 is a flowchart illustrating a power-off process thereof (steps A31 to A42 and B31 to B34). Incidentally, the power-off process illustrated in FIG. 10 is performed after the restart illustrated in FIG. 9.

In FIGS. 9 and 10, the process of the CM#0 is illustrated on the left side, and the process of the CM#1 is illustrated on the right side. Also, in FIGS. 9 and 10, the information indicating the power state of the self-CM, which is transmitted from the inter-FPGA communication control block 304 of each CM 101 to the other CM 101, is indicated by a thick solid line. Furthermore, in FIGS. 9 and 10, the power-on instruction, which is transmitted from the inter-FPGA communication control block 304 of the CM#0 to the CM#1, is indicated by a thick dashed arrow.

In the restart of the storage device, first, in step A11, since the power of the power supply unit 311 of the CM#0 is turned off, the power supply to the control unit 312 is stopped.

In step A12, the power supply factor 305 occurs due to the restart, and in step A13, the factor detection unit 306 of the CM#0 detects the power-on instruction from the power supply factor 305. In step A14, the factor detection unit 306 enables the "power-on instruction to self-CM" register 308.

In step A15, the power supply unit 311 supplies power according to the power supply instruction from the power control block 303, and supplies power to the control unit 312. Also, the power supply unit 311 notifies the power-on state to the power control block 303. In step A16, "1" indicating the power-on state is stored in the self-CM power state register 310 of the power control block 303.

Also, the information indicating the power state of the self-CM, which is notified from the inter-FPGA communication control block 304 of the CM#0 to the inter-FPGA communication control block 304 of the CM#1, is switched from "power off" to "power on". Incidentally, the information indicating the power state of the self-CM, which is notified from the other CM 101, is stored in the other-CM power state register 309 of the power control block 303.

Also, in parallel to step A14 described above, in step A17, the factor detection unit 306 checks whether the power-on instruction is performed by the detection of the factor in the self-CM, that is, whether the power-on instruction is input from the power supply factor 305.

In a case where the power-on instruction is not input from the power supply factor 305 (see NO route of step A17), in step A21, the factor detection unit 306 disables the "power-on instruction to other CM" register 307.

In a case where the power-on instruction is input from the power supply factor 305 (see YES route of step A17), in step A18, the factor detection unit 306 enables the "power-on instruction to other CM" register 307. Therefore, in step A19, the transmission of the power-on instruction from the inter-FPGA communication control block 304 of the CM#0 to the inter-FPGA communication control block 304 of the CM#1 is started.

In step A20, the power control block 303 of the CM#0 checks the power state of the other CM 101 by checking the other-CM power state register 309. That is, the power control block 303 checks whether the power state of the other CM 101 is changed from off to on.

In a case where the power state of the other CM 101 is not changed from off (see "no detection of change from off to on" route of step A20), step A20 is repeated.

In a case where it is detected that the power state of the other CM 101 is changed from off to on (see "detection of change from off to on" route of step A20), the process proceeds to step A21 and the factor detection unit 306 disables the "power-on instruction to other CM" register 307.

Therefore, the transmission of the power-on instruction from the inter-FPGA communication control block 304 of the CM#0 to the inter-FPGA communication control block 304 of the CM#1 is stopped.

On the other hand, in the CM#1, in step B11, the power supply unit 311 of the CM#1 becomes a power-off state and stops the power supply to the control unit 312.

Generally, in the CM power-off process, there is a time difference (for example, 200 msec) between the CM#0 and the CM#1. After the power off (see step A11) and the power on (see step A15) are performed in the CM#0, the power off of the CM#1 (step B11) is performed.

In step B12, the power supply factor 305 occurs due to the restart, and in step B13, the factor detection unit 306 of the CM#1 detects the power-on instruction from the power supply factor 305. In step B14, the factor detection unit 306 enables the "power-on instruction to self-CM" register 308.

In step B15, the power supply unit 311 of the CM#1 supplies power according to the power supply instruction from the power control block 303, and supplies power to the control unit 312. Also, the power supply unit 311 notifies the power-on state to the power control block 303. In step B16, "1" indicating the power-on state is stored in the self-CM power state register 310 of the power control block 303.

Also, the information indicating the power state of the self-CM, which is notified from the inter-FPGA communication control block 304 of the CM#1 to the inter-FPGA communication control block 304 of the CM#0, is switched from "power off" to "power on".

In the CM#0, it is detected that the notified information indicating the power state of the self-CM is switched from "power off" to "power on". As illustrated in step A21, the factor detection unit 306 disables the "power-on instruction to other CM" register 307.

Also, in parallel to step B14 described above, in step B17, the factor detection unit 306 checks whether the power-on instruction is performed by the detection of the factor in the self-CM, that is, whether the power-on instruction is input from the power supply factor 305.

In a case where the power-on instruction is input from the power supply factor 305 (see YES route of step B17), in step B18, the factor detection unit 306 enables the "power-on instruction to other CM" register 307. Therefore, in step B19, the transmission of the power-on instruction from the inter-FPGA communication control block 304 of the CM#1 to the inter-FPGA communication control block 304 of the CM#0 is started.

In step B20, the power control block 303 of the CM#1 checks the power state of the other CM 101 by checking the other-CM power state register 309. That is, the power control block 303 checks whether the power state of the CM#0 is changed from off to on.

In a case where the power state of the other CM#0 is not changed from off (see "no detection of change from off to on" route of step B20), step B20 is repeated.

In a case where it is detected that the power state of the CM#0 is changed from off to on (see "detection of change from off to on" route of step B20) or in a case where it is detected that the power-on instruction is not input from the power supply factor 305 (see NO route of step B17), the process proceeds to the power-off process illustrated in FIG. 10.

As described above, before the power-off of the CM#1, the power-off (see step A11) of the CM#0 and the power-on (see step A15) are performed. Therefore, in the CM#1, it is not detected that the information indicating the power state of the self-CM, which is transferred from the CM#0, is switched from "power off" to "power on". Therefore, in the CM#1, the factor detection unit 306 continuously transmits the power-on instruction from the inter-FPGA communication control block 304 of the CM#1 to the inter-FPGA communication control block 304 of the CM#0, without disabling the "power-on instruction to other CM" register 307.

After that, the storage device performs the power-off process illustrated in FIG. 10.

In the CM#1, in step B31, the power supply unit 311 becomes a power-off state and stops the power supply to the control unit 312.

Also, in the CM#1, as described above, the "power-on instruction to other CM" register 307 enabled in step B18 maintains the enabled state. Therefore, in step B32, the power-on instruction from the inter-FPGA communication control block 304 of the CM#1 to the inter-FPGA communication control block 304 of the CM#0 is continuously transmitted.

In step B33, the power control block 303 of the CM#1 checks the power state of the other CM 101 by checking the other-CM power state register 309. That is, the power control block 303 checks whether the power state of the other CM 101 is changed from off to on.

In a case where the power state of the other CM 101 is not changed from off (see "no detection of change from off to on" route of step B33), the process returns to step B32 and the power-on instruction to the inter-FPGA communication control block 304 of the CM#0 is continuously transmitted.

In a case where it is detected that the power state of the other CM 101 is changed from off to on (see "detection of change from off to on" route of step B33), the process proceeds to step B34 and the factor detection unit 306 disables the "power-on instruction to other CM" register 307.

Therefore, the transmission of the power-on instruction from the inter-FPGA communication control block 304 of the CM#1 to the inter-FPGA communication control block 304 of the CM#0 is stopped.

On the other hand, in the CM#0, in step A31, the power supply unit 311 of the CM#0 becomes a power-off state and stops the power supply to the control unit 312.

However, after that, in step A32, the inter-FPGA communication control block 304 of the CM#0 receives the power-on instruction from the inter-FPGA communication control block 304 of the CM#1.

In the CM#0, the power-on instruction received from the CM#1 is treated as the effective power-on instruction (step A33). In step A34, the factor detection unit 306 of the CM#0 detects the power-on instruction from the power supply factor 305.

In step A35, the factor detection unit 306 enables the "power-on instruction to self-CM" register 308.

In step A36, the power supply unit 311 supplies power according to the power supply instruction from the power control block 303, and supplies power to the control unit 312.

That is, in the power-off process of the storage device, since the CM#0 receives the power-on instruction from the CM#1, unintended power-on is performed.

The power supply unit 311 notifies the power-on state to the power control block 303. In step A37, "1" indicating the power-on state is stored in the self-CM power state register 310 of the power control block 303.

Also, in parallel to step A35 described above, in step A38, the factor detection unit 306 checks whether the power-on instruction is performed by the detection of the factor in the self-CM, that is, whether the power-on instruction is input from the power supply factor 305.

In a case where the power-on instruction is not input from the power supply factor 305 (see NO route of step A38), in step A42, the factor detection unit 306 disables the "power-on instruction to other CM" register 307.

In a case where the power-on instruction is input from the power supply factor 305 (see YES route of step A38), in step A39, the factor detection unit 306 enables the "power-on instruction to other CM" register 307. Therefore, in step A40, the transmission of the power-on instruction from the inter-FPGA communication control block 304 of the CM#0 to the inter-FPGA communication control block 304 of the CM#1 is started.

In step A41, the power control block 303 of the CM#0 checks the power state of the other CM 101 by checking the other-CM power state register 309. That is, the power control block 303 checks whether the power state of the other CM 101 is changed from off to on.

In a case where the power state of the other CM 101 is not changed from off (see "no detection of change from off to on" route of step A41), step A41 is repeated.

In a case where it is detected that the power state of the other CM 101 is changed from off to on (see "detection of change from off to on" route of step A41), the process proceeds to step A42 and the factor detection unit 306 disables the "power-on instruction to other CM" register 307.

As described above, in the storage device 100 that is different from the storage device as an example of an embodiment, in spite of the power-off process of the storage device 100, the power-on instruction from the CM#1 to the inter-FPGA communication control block 304 of the CM#0 may be continuously transmitted. Therefore, the CM#0 becomes a power-off state at an unintended timing.

That is, when the power of the device is turned off after the restart of the storage device 100, an unintended operation of an operator occurs.

On the other hand, in the storage device 1, it is possible to prevent the power of the CM#0 from being unintentionally turned on by the reception of the power-on instruction from the CM#1.

The technology of the disclosure is not limited to the above-described embodiments, and various modifications can be made without departing from the scope of the present embodiments.

For example, the above-described embodiments include two CMs 11A and 11B, but are not limited thereto. Three or more CMs 11 may be included.

Furthermore, in the above-described embodiments, the storage device 1 including the CMs 11A and 11B has been described, but is not limited thereto. That is, by applying to various systems including a redundant structure by a plurality of modules or systems configured by connecting a plurality of modules, the power matching can be performed among the plurality of modules.

Also, the present embodiments disclosed above can be carried out and manufactured by those skilled in the art.

According to an embodiment, it is possible to prevent the occurrence of unintended power-on operations in the control device.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus including a plurality of redundant control devices, wherein a first control device among the plurality of control devices comprises:
 a monitoring unit that monitors a reception of a power-on instruction from a second control device among the plurality of control devices; and
 a prevention unit that prevents an issue of a power-on instruction to the second control device when the monitoring unit detects the power-on instruction from the second control device.

2. The information processing apparatus according to claim 1, wherein the first control device comprises a delay unit that delays a power supply instruction to a power supply unit that supplies the first control device with power, after the power-on instruction from the second control device is input to the first control device.

3. The information processing apparatus according to claim 2, wherein a delay time of the power supply instruction by the delay unit is greater than or equal to a transmission interval of the power-on instruction to the second control device that is periodically transmitted from the first control device to the second control device.

4. A control device provided in redundancy with other control device, comprising:
  a monitoring unit that monitors a reception of a power-on instruction from the other control device; and
  a prevention unit that prevents an issue of a power-on instruction to the other control device when the monitoring unit detects the power-on instruction from the other control device.

5. The control device according to claim 4, comprising a delay unit that delays a power supply instruction to a power supply unit that supplies the control device with power, after the power-on instruction from the other control device is input to the control device.

6. The control device according to claim 5, wherein a delay time of the power supply instruction by the delay unit is greater than or equal to a transmission interval of the power-on instruction to the other control device that is periodically transmitted from the control device to the other control device.

7. A control method for a storage device including a plurality of control devices, wherein a first control device among the plurality of control devices performs:
  a process of monitoring a reception of a power-on instruction from a second control device among the plurality of control devices; and
  a process of preventing an issue of a power-on instruction to the second control device when the power-on instruction from the second control device is detected.

8. The control method apparatus according to claim 7, wherein the first control device performs a process of delaying a power supply instruction to a power supply unit that supplies the first control device with power, after the power-on instruction from the second control device is input to the first control device.

9. The control method according to claim 8, wherein a delay time of the power supply instruction is greater than or equal to a transmission interval of the power-on instruction to the second control device that is periodically transmitted from the first control device to the second control device.

* * * * *